(12) United States Patent
Felt et al.

(10) Patent No.: US 8,799,108 B2
(45) Date of Patent: Aug. 5, 2014

(54) PASSIVE SHOPPING SERVICE OPTIMIZATION

(75) Inventors: Michelle Felt, Randolph, NJ (US); Farida Saeed, Boonton Township, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 726 days.

(21) Appl. No.: 12/938,732

(22) Filed: Nov. 3, 2010

(65) Prior Publication Data

US 2012/0109781 A1 May 3, 2012

(51) Int. Cl.
*G06Q 30/00* (2012.01)

(52) U.S. Cl.
USPC .... 705/26.8; 705/26.1; 705/26.81; 705/26.82

(58) Field of Classification Search
USPC ................................................. 705/26.1–27.2
See application file for complete search history.

(56) References Cited

U.S. PATENT DOCUMENTS

| | | | | |
|---|---|---|---|---|
| 7,702,545 | B1 * | 4/2010 | Compton et al. | 705/26.9 |
| 2009/0150258 | A1 * | 6/2009 | Nokes et al. | 705/27 |
| 2012/0089480 | A1 * | 4/2012 | Fusz | 705/26.41 |

OTHER PUBLICATIONS

"AnyList Launches Holiday Wish List Promotion—Put Your List Online and You May Get What You Wished for" PR Newswire. Seattle, Nov. 2, 1999. Retrieved via ProQuest on Mar. 24, 2014.*

* cited by examiner

*Primary Examiner* — Michael Misiaszek

(57) ABSTRACT

A shopping system may receive, from a user, a request to add information about an item to a watch list associated with the user; may receive, from the user, a price associated with the item; and may receive, from the user, a schedule associated with the item. The shopping system may identify a vendor offer associated with the item and associated with a particular vendor, where the vendor offer includes a price that is less than or equal to the received price, the identifying being based on the schedule associated with the item; and may provide a notification to the user, where the notification includes information about the identified vendor offer.

18 Claims, 10 Drawing Sheets

PASSIVE SHOPPING SERVICE OPTIMIZATION

BACKGROUND INFORMATION

The Internet has become a popular vehicle for users to satisfy many of their needs. For example, many users use the Internet to, for example, communicate with other users, read the news, search for information, or make reservations. One such use of the Internet that is increasingly becoming popular is making online purchases or researching products before visiting a store and making a purchase. However, the amount of information available on the Internet can be daunting to a user, forcing a user to spend a considerable amount of time to sift through all the available information. Shopping online can, therefore, prove to be a bothersome and time-consuming experience.

DETAILED DESCRIPTION OF PREFERRED EMBODIMENTS

Figure 1:
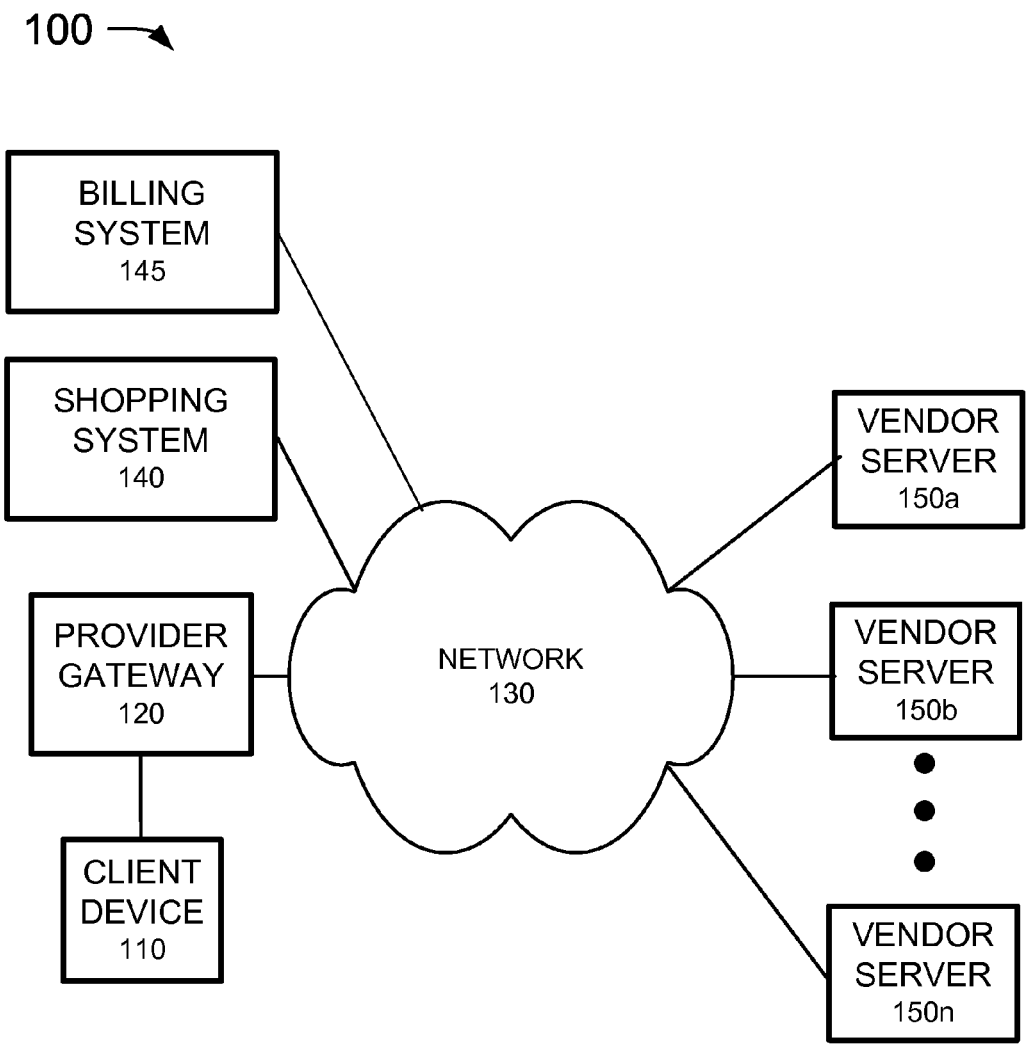
FIG. 1 is a diagram illustrating example components of a system according to an implementation described herein.

The following detailed description refers to the accompanying drawings. The same reference numbers in different drawings identify the same or similar elements. Also, the following detailed description does not limit the invention.

An implementation described herein may relate to optimizing a passive shopping service. A passive shopping service may refer to a service that identifies vendor offers for a user based on the user's specifications and according to the user's schedule, as opposed to an active shopping experience, which may require a user to perform online searches and browsing of vendor web sites. A user may specify a particular item (or keywords describing a particular item) that the user would like to buy, specify a desired price range and/or other criteria, and specify a schedule. A shopping system may identify vendor offers that match the user's price range and/or other criteria, within the context of the user's schedule, and provide an indication to the user about matching offers. In one implementation, an indication may include an alert message provided to the user. Additionally or alternatively, an indication may include a list of items the user is watching along with a list of vendor offers that match the user's specifications regarding the item.

An implementation described herein may further relate to providing, to a user, an option to specify one or more contacts (e.g., other users), may specify a contact level associated with a particular contact, and may specify a privacy setting associated with each item on the user's watch list. A particular item on the user's watch list may be viewed by a particular contact, associated with the user, if the contact level, associated with the particular contact, satisfies a privacy setting, associated with the particular item. For example, a user may specify that a first item may only be viewed by the user, that a second item may be viewed by the user's level 1 contacts (e.g., immediate family), and that a third item may be viewed by the user's level 2 contacts (e.g., the user's co-workers). Thus, a user may be able to maintain a private watch list and one or more public watch lists.

An implementation described herein may further relate to providing, to a user, a notification if a contact, associated with a user, adds an item on the contact's watch list. This may allow the user to view, for example, what items a family member or a friend is looking for, and the user may be provided with the option of adding the item from the contact's watch list to the user's watch list.

An implementation described herein may further relate to providing, to a user, an option to purchase an item on the user's watch list from a particular vendor without having to directly interact with the vendor. This may prevent the user's contact information (e.g., email address) from being provided to the vendor and may prevent the vendor from sending unsolicited emails to the user.

An item, as referred to herein, may include a commercial product, a digital product (e.g., a copyrighted work), a service, a subscription to a product or a service, an investment security, or any other item that may be purchased by a user.

FIG. 1 is a diagram illustrating example components of a system 100 according to an implementation described herein. As shown in FIG. 1, system 100 may include a client device 110, a provider gateway 120, a network 130, a shopping system 140, a billing system 145, and one or more vendors 150a-150n.

Client device 110 may include any device capable of communicating with shopping system 140. Client device 110 may include, for example, a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof. Client device 110 may connect to provider gateway 120 via a wired (e.g., electrical and/or optical) or a wireless connection.

Provider gateway 120 may include one or more devices that provide a connection between client device 110 and network 130. Provider gateway 120 may control the flow of data between client device 110 and network 130, and may include a firewall that may prevent unwanted traffic to reach client device 110. Provider gateway 120 may allow client device 110 to communicate directly with shopping system 140, or with billing system 145, without having to access network 130.

Network 130 may include a circuit-switched network and/or a packet-switched network. For example, network 130 may include one or more of a local area network (LAN), a wide area network (WAN), a metropolitan area network (MAN), a wireless network (e.g., a Code Division Multiple Access (CDMA) network, a general packet radio service (GPRS) network, and/or a Long Term Evolution (LTE) network), an ad hoc network, a public switched telephone network (PSTN), a subset of the Internet, any other network, or any combination thereof. Network 130 may include an Internet Protocol (IP) Multimedia Subsystem network.

Shopping system 140 may include one or more devices (e.g., server devices) that provide a passive shopping service for users. For example, shopping system 140 may allow a user to create and maintain a watch list of items that a user may want to purchase, and may allow the user to specify particular criteria for a particular item on the watch list, such as a price range and/or a schedule. Shopping system 140 may provide one or more notifications to a user when a particular vendor is offering an item on the user's watch list and when the particular vendor's offer matches the user's specified criteria. Shopping system 140 may maintain a database of the user's contacts, may allow the user to specify a contact level for a particular contact, and may determine whether the particular contact may view a particular item on the user's watch list based on a privacy setting associated with the particular item.

Billing system 145 may include one or more devices that provide a purchasing service for a user. For example, billing system 145 may interact with shopping system 140 to allow a user to purchase an item on the user's watch list without having to directly interact with a vendor that is selling the product.

One or more vendors 150a-150n may include one or more devices that provide offers on items. For example, particular ones of vendors 150a-150n may include web sites that sell, or are otherwise associated with, particular types of products or services and may be competing with each other for the user's business.

Although FIG. 1 shows example components of system 100, in other implementations, system 100 may include fewer components, different components, differently arranged components, or additional components than depicted in FIG. 1. Additionally or alternatively, one or more components of system 100 may perform some or all of the tasks described as being performed by one or more other components of system 100.

Figure 2:
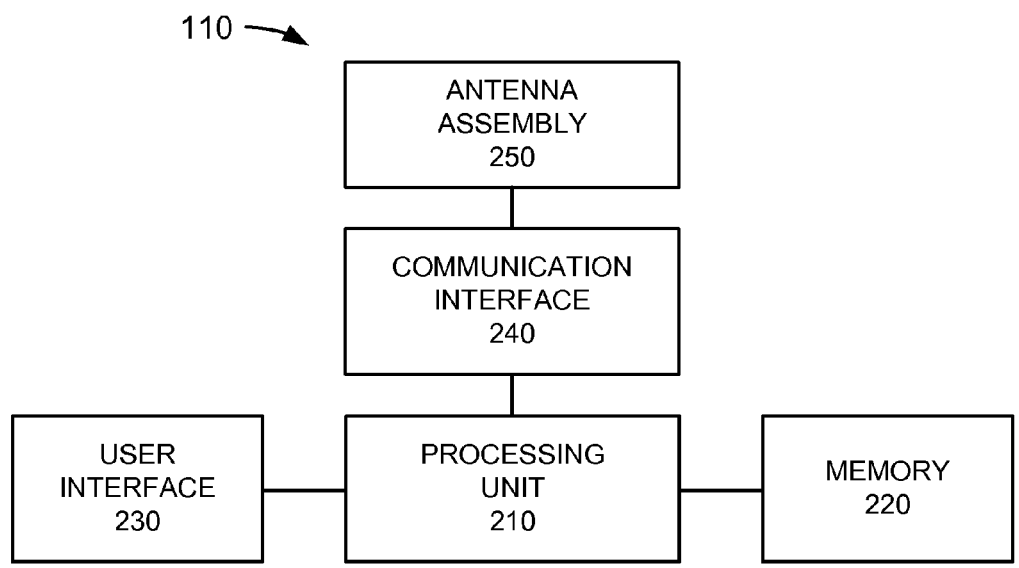
FIG. 2 is a diagram illustrating example components of the client device of FIG. 1 according to an implementation described herein.

FIG. 2 is a diagram illustrating example components of client device 110, in an implementation where client device 110 corresponds to a mobile communication device, according to an implementation described herein. As shown in FIG. 2, client device 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or the like. Processing unit 210 may control operation of client device 110 and its components.

Memory 220 may include a random access memory (RAM), a read only memory (ROM), and/or another type of memory to store data and instructions that may be used by processing unit 210.

User interface 230 may include mechanisms for inputting information to client device 110 and/or for outputting information from client device 110. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, or keys of a keypad) to permit data and control commands to be input into client device 110; a display to output visual information; and/or a vibrator to cause client device 110 to vibrate.

Communication interface 240 may include any transceiver-like mechanism that enables client device 110 to communicate with other devices and/or systems. For example, communication interface 240 may include a modem or an Ethernet interface to a local area network (LAN). Communication interface 240 may also include mechanisms for communicating via a network, such as a wireless network. For example, communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air and receive RF signals over the air and provide them to communication interface 240.

As described herein, client device 110 may perform certain operations in response to processing unit 210 executing software instructions contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of client device 110, in other implementations, client device 110 may include fewer components, different components, differently arranged components, or additional components than depicted in FIG. 2. Additionally or alternatively, one or more components of client device 110 may perform some or all of the tasks described as being performed by one or more other components of client device 110.

Figure 3:
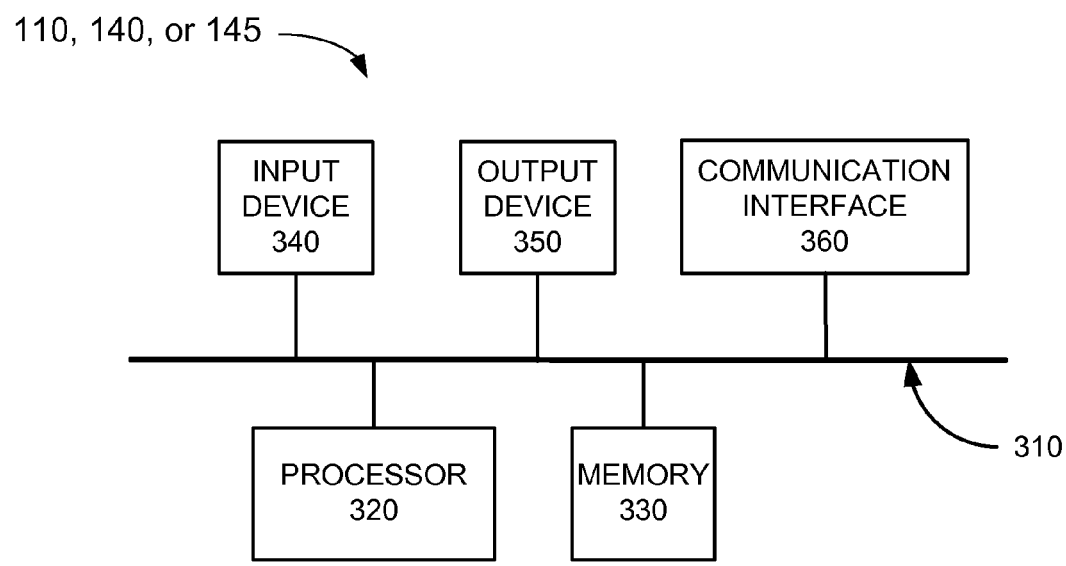
FIG. 3 is a diagram illustrating example components of the client device or the shopping system of FIG. 1.

FIG. 3 is a diagram illustrating example components of client device 110 (e.g., in an implementation where client device 110 corresponds to a personal computer, a workstation, or a laptop computer), shopping system 140, or billing system 145. As shown in FIG. 3, client device 110, shopping system 140, or billing system 145 may include a bus 310, a processor 320, a memory 330, an input device 340, an output device 350, and a communication interface 360.

Bus 310 may include a path that permits communication among the components of client device 110, shopping system 140, or billing system 145. Processor 320 may include one or more processors, microprocessors, or processing logic (e.g., ASICs or FPGAs) that may interpret and execute instructions. Memory 330 may include a RAM device or another type of dynamic storage device that may store information and instructions for execution by processor 320, a ROM device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to client device 110, shopping system 140, or billing system 145, such as a keypad, a button, a pen, a touch screen, voice recognition and/or biometric mechanisms, etc. Output device 350 may include a mechanism that outputs information to the operator, such as a display, a speaker, etc. Communication interface 360 may include any transceiver-like mechanism that enables client device 110, shopping system 140, or billing system 145 to communicate with other devices and/or systems. For example, communication interface 360 may include a modem, a network interface card, or a wireless interface card.

As will be described in detail below, client device 110, shopping system 140, or billing system 145 may perform certain operations. Client device 110, shopping system 140, or billing system 145 may perform these operations in response to processor 320 executing software instructions contained in a computer-readable medium, such as memory 330.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of client device 110, shopping system 140, or billing system 145, in other implementations, client device 110, shopping system 140, or billing system 145 may include fewer components, different components, additional components, or differently arranged components than depicted in FIG. 3. Additionally or alternatively, one or more components of client device 110, shopping system 140, or billing system 145 may perform one or more tasks described as being performed by one or more other components of client device 110, shopping system 140, or billing system 145.

Figure 4:
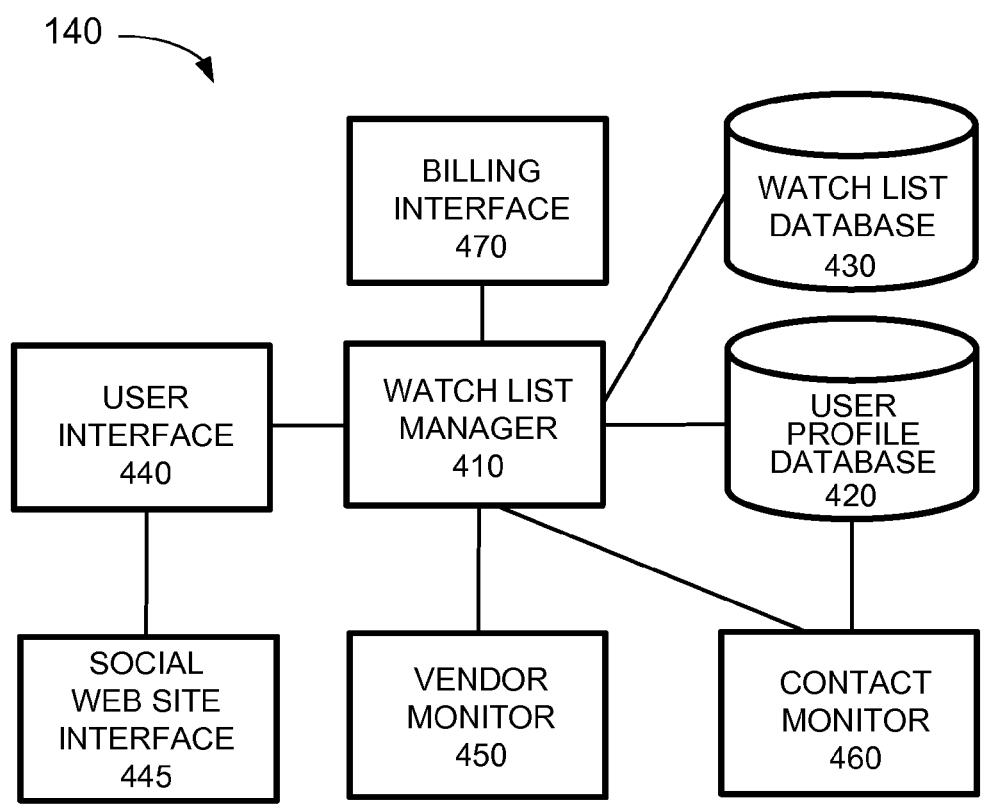
FIG. 4 is a diagram illustrating example functional components of the shopping system of FIG. 1.

FIG. 4 is a diagram illustrating example functional components of shopping system 140. As shown in FIG. 4, shopping system 140 may include a watch list manager 410, a user profile database 420, a watch list database 430, a user interface 440, a social web site interface 445, a vendor monitor 450, a contact monitor 460, and a billing interface 470.

Watch list manager 410 may manage a user's watch list. For example, watch list manager 410 may receive, via user interface 440, a request to add and/or modify a new item to the user's watch list and may receive specifications associated with the item from the user; may receive a request to remove an item from the user's watch list; may determine when to provide a notification about a particular vendor offer associated with a particular item on the user's watch list; may rank items on the user's watch list and may rank vendor offers associated with items on the user's watch list; may communicate with vendor monitor 450 to receive information about identified vendor offers associated with items on the user's watch list; may indicate to billing interface 470 when a user request to purchase an item on the user's watch list; may communicate with contact monitor 460 to determine which contacts are allowed to view a particular item on the user's watch list and/or to notify a user when a contact associated with the user has added an item to the contact's watch list; or may perform another action associated with management of the user's watch list.

User profile database 420 may store information associated with particular users and may store information about contacts associated with the particular users. Watch list database 430 may store information about watch lists associated with particular users. A watch list, associated with a particular user, may include items that the particular user is shopping for or intends to purchase sometime in the future.

User interface 440 may interact with client device 110 to generate a user interface to provide a watch list to a user and/or to provide notifications to a user about items on the user's watch list and to receive input from the user regarding the user's watch list. Social web site interface 445 may allow a user to view, modify, and/or display the user's watch list via a social network web site (e.g., Facebook, Bebo, Twitter, Myspace, LinkedIn, etc.). For example, a user may view, modify, and/or post the user's wish list, or part of the user's wish list, via an account associated with the user at a particular social network web site. Additionally, a user may configure, via social web site interface 445, updates to the user's wish list, or to particular portions of the user's wish list, to be automatically provided as updates to the account associated with the user at the particular social network web site. Additionally or alternatively, friends of the user may view the user's watch list, or one or more portion of the user's watch list, via a social network web site. Permissions to view the user's wish list, or one or more portion of the user's watch list, may be set via the social network web site and/or via settings associated with shopping system 140 (e.g., via contact field 530, described below with reference to FIG. 5). Thus, a friend of the user may access (e.g., navigate to) a web page associated with the user's account on a social network web site and view the user's watch list, or one or more portions of the user's watch list on the accessed web page.

Vendor monitor 450 may monitor vendor offers associated with particular ones of vendor servers 150a-150n. For example, vendor monitor 450 may access (e.g., crawl) vendor servers 150a-150n; may send requests to vendor servers 150a-150n to obtain information about vendor offers associated with particular ones of vendors 150a-150n; may receive information from vendors 150a-150n about vendor offers associated with particular ones of vendors 150a-150n without requesting the information; may periodically receive information from particular ones of vendors 150a-150n; and/or may intercept unsolicited messages (e.g., emails and/or text messages) from particular ones of vendors 150a-150n to client device 110.

Contact monitor 460 may monitor contacts associated with a particular user. For example, contact monitor 460 may determine whether a contact associated with the user is allowed to view a particular item on the user's watch list; may determine whether the user is allowed to view a particular item on a watch list of a contact associated with the user; may determine whether to send a notification to the user if a contact associated with the user has added an item to the contact's watch list; and/or may determine whether to send a notification to a contact associated with the user when the user has added an item to the user's watch list.

Billing interface 470 may communicate with billing system 145 to facilitate a purchase of a particular item on a user's watch list in response to receiving a request from the user to purchase the particular item.

Although FIG. 4 shows example functional components of shopping system 140, in other implementations, shopping system 140 may include fewer functional components, different functional components, differently arranged functional components, or additional functional components than depicted in FIG. 4. Additionally or alternatively, one or more functional components of shopping system 140 may perform one or more of the tasks described as being performed by one or more other functional components of shopping system 140.

Figure 5A:
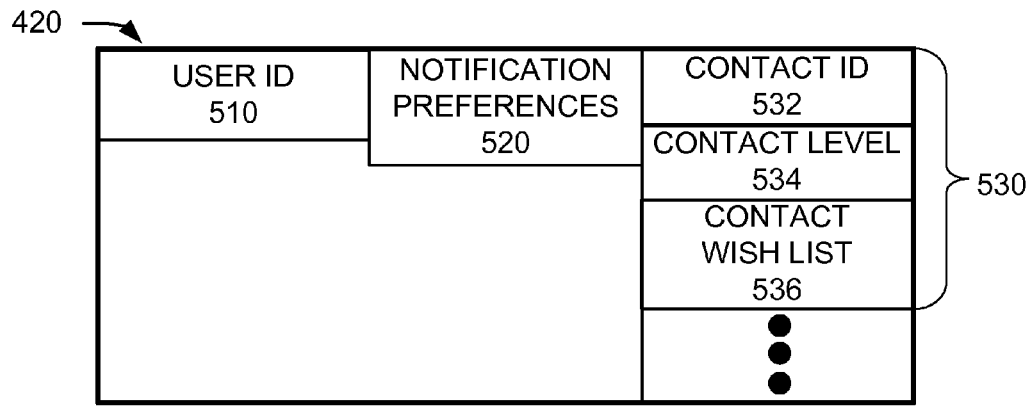
FIG. 5A is a diagram of example fields that may be stored within the user profile database of FIG. 4 according to an implementation described herein.

FIG. 5A is a diagram of example fields that may be included within user profile database 420. As shown in FIG. 5A, user profile database 420 may include a user identification (ID) field 510, a notification preferences field 520, and one or more contact fields 530 (referred to herein as collectively as "contact fields 530" and individually as "contact field 530").

User ID field 510 may store an identification string that uniquely identifies a particular user. Additionally or alternatively, user ID field 510 may store other identification information associated with the user. Notification preferences field 520 may store notification preferences associated with the user. For example, notification preferences field 520 may store information about how the watch list is to be provided to the user, when the user would like the watch list to be provided to the user (e.g., at particular intervals), or any other information about how the user would like to be notified about changes in the watch list (e.g., when new vendor offers have been identified).

Contact field 530 may store information about a particular contact associated with the user. Contact field 530 may include a contact ID field 532, a contact level field 534, and a contact wish list field 536. Contact ID field 532 may store an identification string that identifies a particular contact. Additionally or alternatively, contact ID field 532 may store other identification information associated with the contact. Contact level field 534 may identify a particular contact level associated with the contact. A contact level may include a measure of how close the contact is to the user in terms of relationship. A contact, in contact field 530, may automatically get assigned a contact level of 1, and the user may select a different contact level for the contact. For example, the user may assign to the people closest to the user (e.g., immediate family) a contact level of 2, may assign to the user's friend a contact level of 2, may assign to the user's co-workers a contact level of 3, etc. The contact level of a particular contact may be used in connection with a privacy level of a particular item on the user's watch list to determine whether the contact is allowed to view the particular item.

Contact wish list 536 may include a wish list associated with a particular contact. For example, the user may select items from the user's wish list that may only be viewed by the particular contact associated with contact ID field 532 and include the selected items in contact wish list 536. For example, assume a user, Sally, wants to indicate particular items from the Sally's wish list that are only viewable by her friend, Jimmy. Sally may create a contact for Jimmy and may include, in contact wish list 536 of contact field 530 associated with Jimmy, items from Sally's wish list that only Jimmy can view. For example, Sally can indicate items that she would like Jimmy to buy for her birthday, such as, for example, Godiva Dark Chocolate, No. 23 flower arrangement from 1-800-Flowers, and a Forever Boston Fendi Bag.

Contact wish list 536 may include a notification setting associated with the particular contact. For example, a user may indicate that the user would like a particular reminder at a particular time period for the contact (e.g., a reminder to buy flowers for Sally once a month).

Although FIG. 5A shows example fields of user profile database 420, in other implementations, user profile database 420 may include fewer fields, different fields, additional fields, or differently arranged fields than depicted in FIG. 5A. Additionally or alternatively, one or more fields of user profile database 420 may store information described as being stored in one or more other fields of user profile database 420.

Figure 5B:
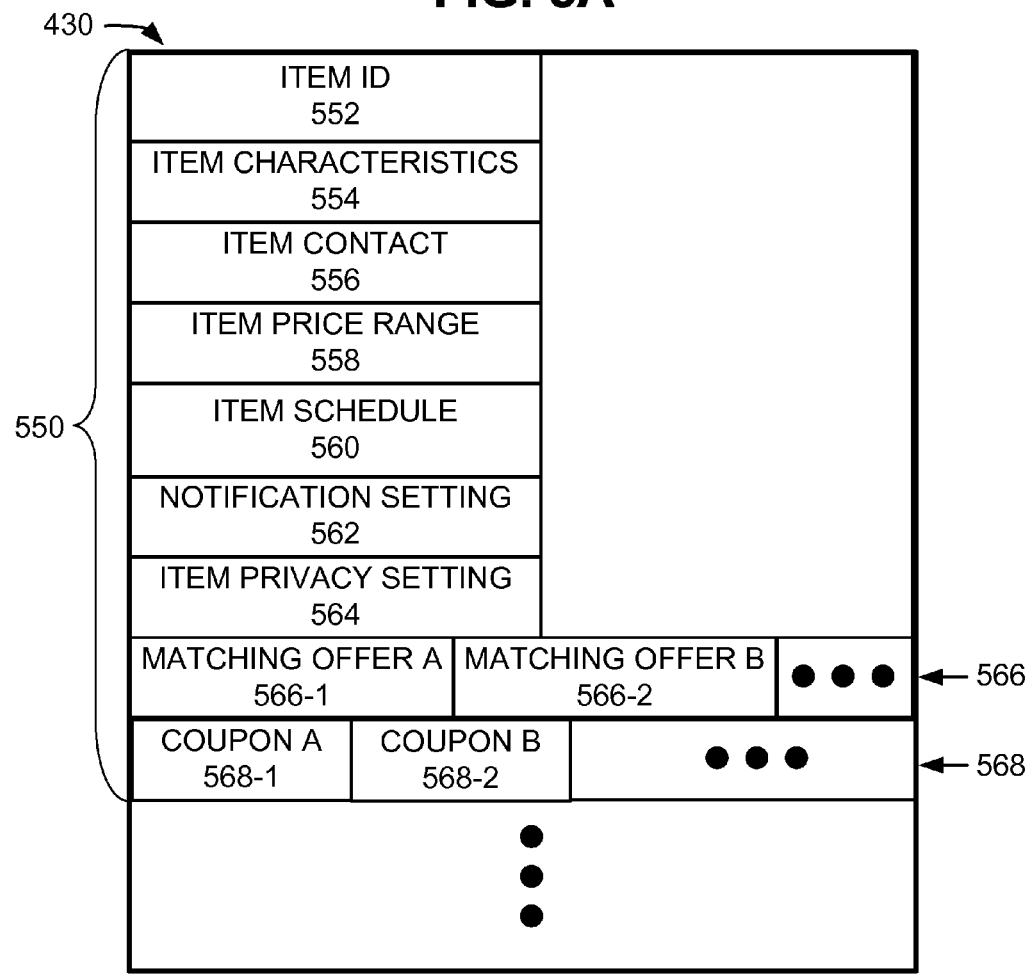
FIG. 5B is a diagram of example fields that may be stored within the watch list database of FIG. 4 according to an implementation described herein.

FIG. 5B is a diagram of example fields that may be included within watch list database 430. As shown in FIG. 5B, watch list database 430 may include one or more item fields 550 (referred to herein as collectively as "item fields 550" and individually as "item field 550") that may be associated with a user.

Item field 550 may include an item ID field 552, an item characteristics field 554, an item contacts level field 556, an item price range field 558, an item schedule field 560, a notification setting field 562, an item privacy setting 564, a matching offers field 566, and a coupon field 568.

Item ID field 552 may store an identification string that identifies a particular item. For example, item ID field 552 may store a name of the item, a manufacturer and/or model of the item, or a Universal Product Code (UPC) or another code associated with the item. Additionally or alternatively, item ID field 552 may store other identification information associated with the item. Item characteristics field 554 may store additional information associated with the item. For example, item characteristics field 554 may store one or more keywords and/or phrases associated with the item.

Item contact field 556 may include information associating the item with a particular contact associated with the user. For example, some items on the user's watch list may be associated with the user, while other items on the user's watch list may be associated with a contact associated with the user.

Item price range field 558 may include information about a price range specified for the item. For example, item price range field 558 may include a maximum price specified by the user and a minimum price specified by the user. Furthermore, the user may specify an additional price range, such as for example, for dates outside of the user's schedule. For example, a user may specify a first maximum price within the dates specified by the user's schedule, and may specify a second maximum price range, less by a particular amount than the first maximum price range, for dates outside of the user's schedule. Thus, if a vendor offer is identified with a lower price than the user would be willing to pay during the dates specified by the user's schedule, the user may still be notified.

Item schedule field 560 may include information specifying a schedule associated with the item. For example, item schedule field 560 may include a date range indicating a time during which the user is looking for the item.

Notification setting field 562 may include information specifying how and/or when the user would like to be notified when new vendor offers are identified for the item and/or when changes in vendor offers are identified for the item. For example, a user may specify an immediate notification when a vendor offer is identified; may specify to receive a daily list with matching offers; and/or may specify other time periods when reminders are to be sent to the user. Furthermore, a user may specify to be notified of a vendor offer for the item, even if the vendor offer does not fall within the dates specified by the user in the schedule, if the price associated with the vendor offer meets particular criteria (e.g., the item is on sale and is available at a discount). In addition, a user may specify one or more destinations for the notifications. The destination(s) may include a telephone number, an email address, etc. Moreover, the user may specify a manner of delivery for the notifications, such as by an email message, an instant messenger message, a Short Message Service (SMS) message, a telephone call, etc.

Item privacy setting field 564 may include information identifying a privacy setting associated with the item. For example, in one implementation, the user may indicate an item is private (e.g., viewable only by the user) or public (e.g., viewable by other users, such as contacts associated with the user). In another implementation, the user may indicate a particular privacy level that indicates which contacts are allowed to view the item. In yet another implementation, the user may specify particular contacts that may view the item.

Matching offers field 566 may store information about one or more identified matching vendor offers associated with the item. For example, a particular matching offer field 566 may store information identifying a particular vendor; may store a rating associated with the particular vendor; may store discounts associated with the vendor offer associated with the item; may store a regular price associated with the item; may store an offered price associated with the item; and/or may store a date associated with the offered price.

Coupon field 568 may store information about one or more identified coupons associated with the item. In one implementation, a particular coupon may be associated with a particular matching offer. For example, coupon 568-1 may be associated with matching offer 566-1. In another implementation, a particular coupon may not be explicitly associated with a particular matching offer (e.g., a manufacturer's coupon or rebate offer).

Although FIG. 5B shows example fields of watch list database 430, in other implementations, watch list database 430 may include fewer fields, different fields, additional fields, or differently arranged fields than depicted in FIG. 5B. Additionally or alternatively, one or more fields of watch list database 430 may store information described as being stored in one or more other fields of watch list database 430.

Figure 6:
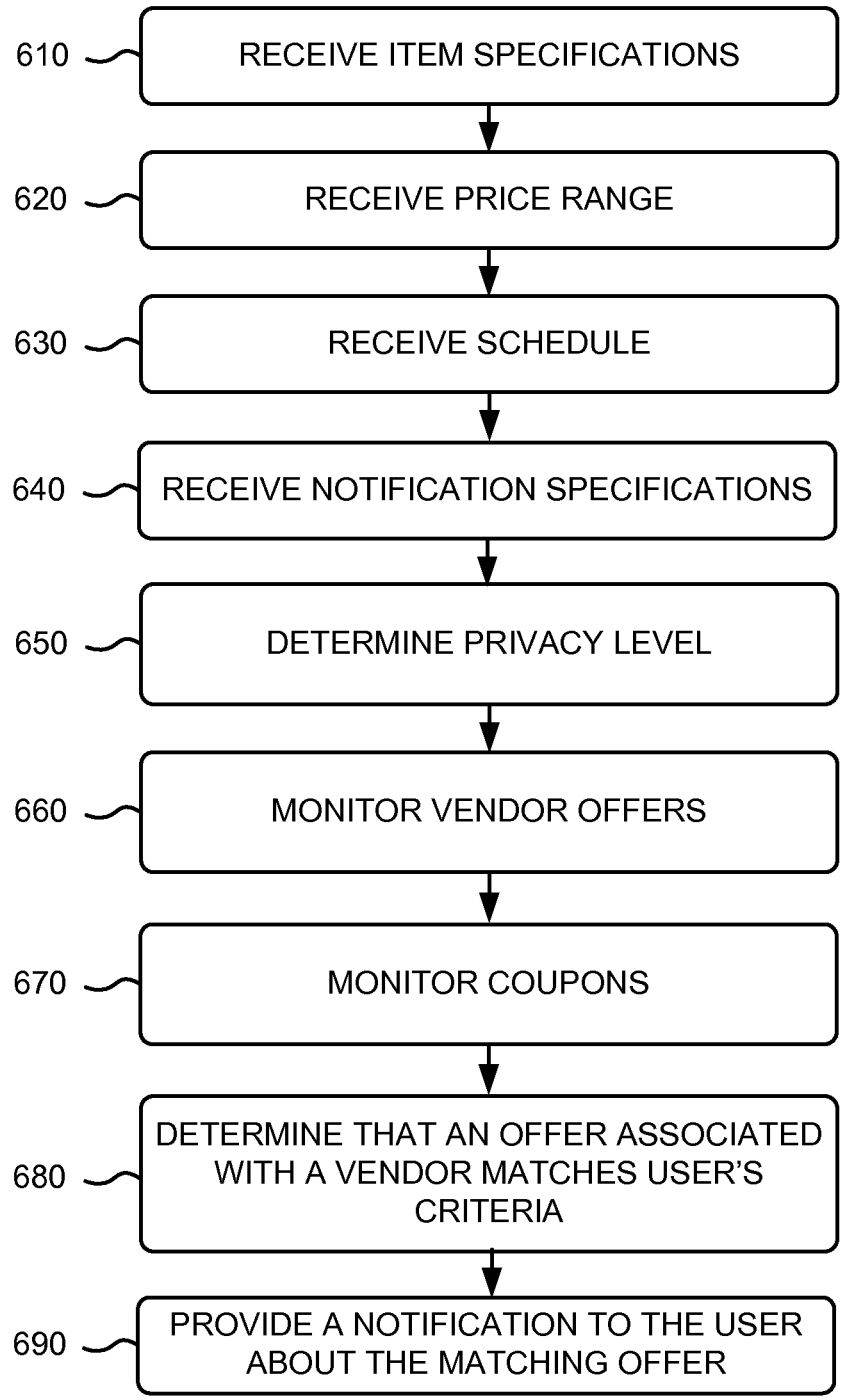
FIG. 6 is a flow diagram illustrating an example process of receiving item specifications and providing notifications according to an implementation described herein.

FIG. 6 is a flow diagram illustrating an example process of receiving item specifications and providing notifications according to an implementation described herein. In one implementation, the process of FIG. 6 may be performed by shopping system 140. In other implementations, some or all of the process of FIG. 6 may be performed by another device or a group of devices separate from or including shopping system 140.

The process of FIG. 6 may include receiving item specifications (block 610). For example, user interface 440 may receive, from a client device 110 associated with a user, a request to add an item to the user's watch list. If the user has no items in a watch list, a watch list may be created for the user. Watch list manager 410 may store an item ID in item ID field 552 of item record 550 associated with the item.

In one implementation, a user may access the watch list by navigating a browser application to a particular Uniform Resource Locator (URL) associated with the user's watch list. When a user first accesses the watch list, the user may be provided with an option to add a bookmark, a button, or a tab, associated with the user's watch list, to the browser application installed on client device 110. Thus, a user may access the watch list by activating (e.g., clicking on) the bookmark, button, or tab when using the browser application. Additionally or alternatively, a user may be provided with an option to add a feature to the user's homepage to access the user's watch list.

In another implementation, the user may access the watch list by installing a passive shopping application on client device 110. For example, a user may be provided with an option to download the application when the user navigates a browser application to a URL associated with the passive shopping application, or when a user activates an application that allows the user to access network 130 via provider gateway 120. In one implementation, the passive shopping application may correspond to an add-on application associated with a browser application. In another implementation, the passive shopping application may include an application independent of a browser application.

A user may provide item specifications in a number of different ways. For example, a user may input a product name and a model number. As another example, a user may enter one or more keywords and shopping system 140 may, in response to receiving the one or more keywords, provide the user with a list of products that match the user's entered one or more keywords. The user may then select one or more of the products from the provided list. As another example, a user may perform an Internet search and may select one or more search results as an item to include in the user's watch list (e.g., by dragging and dropping one of the search results from a search results window into a watch list window). As yet another example, a user may specify a type of product without specifying a particular manufacturer and/or model.

The user may provide additional specifications relating to the item, such as, for example, a desired accessory, a particular type of warranty, whether the user is interested in a used version of the item, a physical distance between the user's location and the location of a store associated with a vendor, a return policy associated with a vendor, user ratings associated with the item and/or a vendor, and/or any other type of specification that may be included for a particular item. Watch list manager 410 may store information about the item characteristics in item characteristics field 554 of item record 550 associated with the item. Moreover, a user may associate a particular contact with the item. Watch list manager 410 may store information identifying the particular contact in contact field 556 of item record 550 associated with the item. If the item is associated with the user, and not another contact, watch list manager 410 may include an indication in contact field 556 that the item is associated with the user. Contact field 556 may have a default setting indicating that the item is associated with the user (and not one of the user's contacts).

A price range may be received (block 620). For example, user interface 440 may receive, from client device 110, a price range for the item. For example, a user may be given an option to specify a particular price range, such as a highest acceptable price. If the user has specified that the user is interested in a used version of the item, the user may also specify a lowest acceptable price, which may be indicative of a used item's condition. For example, a user may also specify a highest price for a new version of the item and a highest price for a used version of the item. Furthermore, a user may also specify a different price range for the item for dates outside of the user's schedule. For example, if the user is looking for an item for an upcoming holiday season, the user may specify a price range for a period of time prior to the holiday season. Additionally, the user may specify to be notified if the item is available at a particular price outside of this time period (e.g., if the item is on at least a 10% sale within 2 months of the holiday season). Watch list manager 410 may store information identifying the price range in item price range field 558 of item record 550 associated with the item.

A schedule may be received (block 630). For example, user interface 440 may receive, from client device 110, a schedule for the item. The user may be given an option to specify a date range associated with the item. For example, the user may specify to look for a seasonal item at the beginning of a new season, to look for a particular item as a birthday gift for a family member before the family member's birthday, to monitor for a particular item continuously, etc. Watch list manager 410 may store information about the schedule in item schedule field 560 of item record 550 associated with the item.

Notification specifications may be received (block 640). For example, user interface 440 may receive, from client device 110, notification specifications associated with the item. A user may specify how and/or when the user would like to get notified when vendor offers, which match the user's criteria regarding the item, are identified. For example, a user may be given the option of specifying an immediate notification when a vendor offer is identified or the user may be given the option of receiving a daily list with matching offers. Additionally, a user may be given the option of specifying if reminders are to be sent to the user. For example, assume the user has indicated a schedule for the item that expires in 5 days (e.g., corresponding to a friend's birthday). The user may be given the option of specifying to receive a first reminder about the item 3 days before the item expires and a second reminder one day before the item expires. As another example, assume a vendor offer (e.g., a sale) is scheduled to end at a particular time. A user may be given an option to specify one or more reminders before the offer ends. A user may specify one or more destinations for the notifications, such a particular phone number, email address, instant messenger address, etc. Furthermore, a user may specify a manner of delivery for the notifications, such as by an email message, an instant messenger message, an SMS message, a pop-up message associated with an application installed on client device 110, etc. Watch list manager 410 may store information about the notification specification in notification setting field 562 of item record 550 associated with the item.

A privacy level may be determined (block 650). For example, user interface 440 may receive, from client device 110, a privacy level associated with the item. In one implementation, the user may be given the option to indicate whether the item is to be associated with a private watch list, viewable only by the user, or whether the item is to be associated with a publish watch list, viewable by other users. In another implementation, the user may be given an option to indicate multiple privacy levels. For example, the user may be given the option to indicate a first privacy level associated with the user (e.g., only the user may view the item), a second privacy level associated with a first level of contacts (e.g., the user's spouse and/or immediate family), a third privacy level associated with a second level of contacts (e.g., the user's friends), a fourth privacy level (e.g., the user's co-workers), etc. In one implementation, a particular privacy level may be associated with one particular contact level, indicating only the contact associated with the particular contact level are allowed to view items associated with the particular privacy level. In another implementation, a particular privacy level may be associated with multiple contact levels (e.g., indicating that a contact associated with a particular contact level is allowed to view items associated with the particular privacy level as well as items associated with privacy levels lower than the particular privacy level). Watch list manager 410 may store information about the privacy setting in privacy setting field 564 of item record 550 associated with the item.

Vendor offers may be monitored (block 660). For example, vendor monitor 450 may monitor for vendor offers. Vendor monitor 450 may access (e.g., crawl) vendor servers 150a-150n, or send requests to vendor servers 150a-150n, to obtain information about vendor offers associated with particular ones of vendors 150a-150n. Additionally or alternatively, vendor monitor 450 may receive information from vendors 150a-150n about vendor offers associated with particular ones of vendors 150a-150n, without requesting the information. For example, vendors 150a-150n may periodically send the information to shopping system 140, or may send information about a new offer to shopping system 140 when a new offer becomes available. As another example, shopping system 140 may intercept unsolicited messages (e.g., emails and/or text messages) from particular ones of vendors 150a-150n to client device 110.

Coupons may be monitored (block 670). For example, vendor monitor 450 may monitor for coupons associated with the item. In one implementation, coupons may be identified in association with vendor offers. In another implementation, coupons may be identified independently of vendor offers. For example, a coupon may include a manufacturer's coupon or rebate offer that may be independent of a particular vendor offer.

A determination may be made than an offer associated with a vendor matched the user's criteria based on the user's schedule (block 680). For example, vendor monitor 450 may compare vendor offers associated with particular ones of vendors 150a-150n with the user's watch list to determine whether a vendor offer matches a user's specified criteria (e.g., the specified price range) within the user's specified schedule. An identified matching vendor offer may be stored in matching offer field 566 of item record 550 associated with the item. For example, watch list monitor 410 may store one or more of a vendor name associated with the vendor offer, a vendor rating associated with the vendor, a discount associated with the item, a regular price associated with the item, an offer price associated with the vendor offer, a date associated with the vendor offer, and/or a coupon associated with the vendor and/or the vendor offer.

An indication may be provided to the user about the matching offer (block 690). When vendor monitor 450 identifies a matching offer, the matching offer may be added by watch list manager 410 to matching offer field 566 of item record 550, associated with the item. Watch list manager 410 may determine, by accessing notification setting 562, how to notify the user of the matching offer. For example, watch list manager 410 may send, via user interface 440, an immediate alert to client device 110. As another example, watch list manager 410 may provide a daily notification at a particular time of day to client device 110, including identified offers associated with particular items in watch list database 430. As yet another example, watch list manager 410 may create a list of identified offers associated with particular items in watch list database 430 and provide the created list to client device 110 in response to the user accessing a particular URL associated with the user's watch list, or in response to the user activating a passive shopping application via client device 110.

Figure 7:
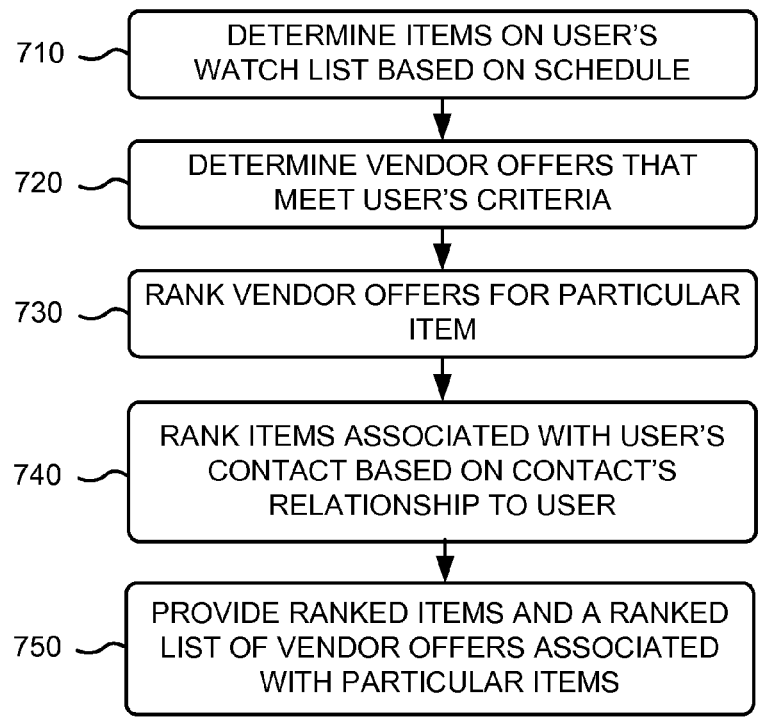
FIG. 7 is a flow diagram illustrating a first example process of providing notifications according to an implementation described herein.

FIG. 7 is a flow diagram illustrating a first example process of providing notifications according to an implementation described herein. In one implementation, the process of FIG. 7 may be performed by shopping system 140. In other implementations, some or all of the process of FIG. 7 may be performed by another device or a group of devices separate from or including shopping system 140. The process of FIG.

7 illustrates a process of providing a ranked list of items, and a ranked list of vendor offers associated with particular items, to a user.

The process of FIG. 7 may include determining items on user's watch list based on a schedule (block 710). For example, watch list monitor 410 may determine, by accessing item schedule field 560 of item records 550 of watch list database 430 associated with the user, which items on the user's watch list have a schedule associated with a current date. If the current date falls within a date range associated with an item's schedule, watch list monitor 410 may include the item in a ranked list of items to be provided to the user.

Vendor offers that meet the user's criteria may be determined (block 720). For example, watch list monitor 410 may access matching offer field 566 associated with a particular item to determine vendors that meet the user's criteria. The vendor offers may be ranked for a particular item (block 730). For example, watch list monitor 410 may assign a rank score to the vendor offers based on price. Additionally or alternatively, watch list monitor 410 may rank the vendor offers using additional or alternative criteria, such as criteria specified in item characteristics field 554 of the item record 550 associated with the item.

Items associated with a user's contact may be ranked based on the contact's relationship to the user (block 740). For example, watch list manager 410 may assign a rank score to the items on the user's watch list using information stored in item contact field 556 of item records 550 associated with particular items. For example, watch list manager 410 may rank items associated with the user first, rank items associated with the user's first contact level second (e.g., the user's immediate family), rank items associated with the user's second contact level third (e.g., the user's friends), etc. Additionally or alternatively, items may be ranked based on additional factors, such as, for example, the schedules associated with particular items. Thus, items that include a schedule that will end soon, or items that include vendor offers that may expire soon, may be given preference and ranked higher.

Ranked items and a ranked list of vendor offers associated with particular items may be provided to the user (block 750). For example, watch list manager 410, in connection with user interface 440, may generate a document that includes a ranked list of items and a ranked list of vendor offers associated with particular items, where the position of an item is based on a rank score associated with the item, and where the position of vendor offers associated with the item is based on rank scores associated with the vendor offers. Based on notification settings associated with the items on the generated document, the generated document may be provided to a user in a notification, a notification may be sent to the user that the document is available, or no notification may be sent to the user (e.g., the user may have to access the user's watch list to view the document). The generated document may include selectable links, associated with particular vendors, which allow the user to navigate to the item on the particular vendor's web site. An example user interface displaying a generated watch list document is described below with reference to FIG. 11.

Figure 8:
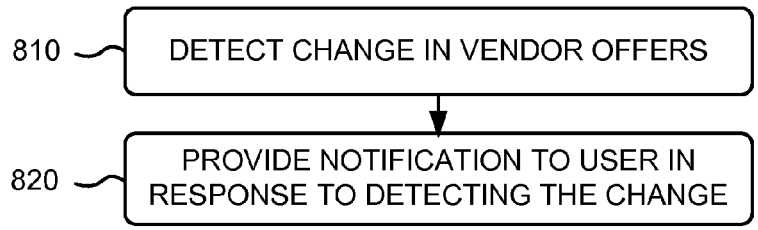
FIG. 8 is a flow diagram illustrating a second example process of providing notifications according to an implementation described herein.

FIG. 8 is a flow diagram illustrating a second example process of providing notifications according to an implementation described herein. In one implementation, the process of FIG. 8 may be performed by shopping system 140. In other implementations, some or all of the process of FIG. 8 may be performed by another device or a group of devices separate from or including shopping system 140.

The process of FIG. 8 may include detecting a change in vendor offers (block 810). For example, vendor monitor 450 may determine that a particular vendor has lowered the price on an item on a user's watch list. A notification may be provided to the user in response to detecting the change (block 820). For example, watch list manager 410 may access notification setting 562 associated with the item on the user's watch list, and may determine that the user has indicated that the user would like an immediate notification if a better offer is identified. In response to detecting the new offer and based on determining that the user would like an immediate notification, watch list manager 410, in connection with user interface 440, may provide a notification to the user. An example user interface that includes a notification is described below with reference to FIG. 12. The notification may be provided in any form applicable to user interface 230 or to output device 350. For example, the notification may include an email message, a Short Message Service (SMS) message, a pop-up message associated with a browser application or another application, an alert message analogous to a missed call message, a message incorporated into a screen saver, and/or an audible message or audible alert signal.

Figure 9:
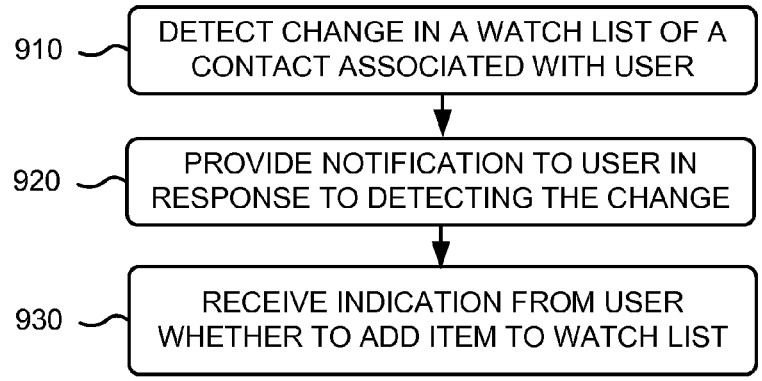
FIG. 9 is a flow diagram illustrating a third example process of providing notifications according to an implementation described herein.

FIG. 9 is a flow diagram illustrating a third example process of providing notifications according to an implementation described herein. In one implementation, the process of FIG. 9 may be performed by shopping system 140. In other implementations, some or all of the process of FIG. 9 may be performed by another device or a group of devices separate from or including shopping system 140.

The process of FIG. 9 may include detecting a change in a watch list of a contact associated with the user (block 910). For example, contact monitor 460 may determine that a contact associated with the user has included a new item in the contact's watch list. Contact monitor 460 may determine, based on a privacy level set by the contact for the new item, that the user is allowed to view the item.

A notification may be provided to the user in response to detecting the change (block 920). For example, watch list monitor 410, in connection with user interface 440, may send a notification to the user that the contact has added a new item to the contact's watch list. The notification may include a simple message, such as, for example, the message "Jerry has added a grill to his shopping list. Would you like to add the grill to your shopping list?" The notification may be provided in any form applicable to user interface 230 or to output device 350. For example, the notification may include an email message, a Short Message Service (SMS) message, a pop-up message associated with a browser application or another application, an alert message analogous to a missed call message, a message incorporated into a screen saver, and/or an audible message or audible alert signal.

An indication may be received from the user whether to add the item to the user's watch list (block 930). The user may indicate, via user interface 440, that the user would like to add the item to the user's watch list in associated with the contact.

Figure 10:
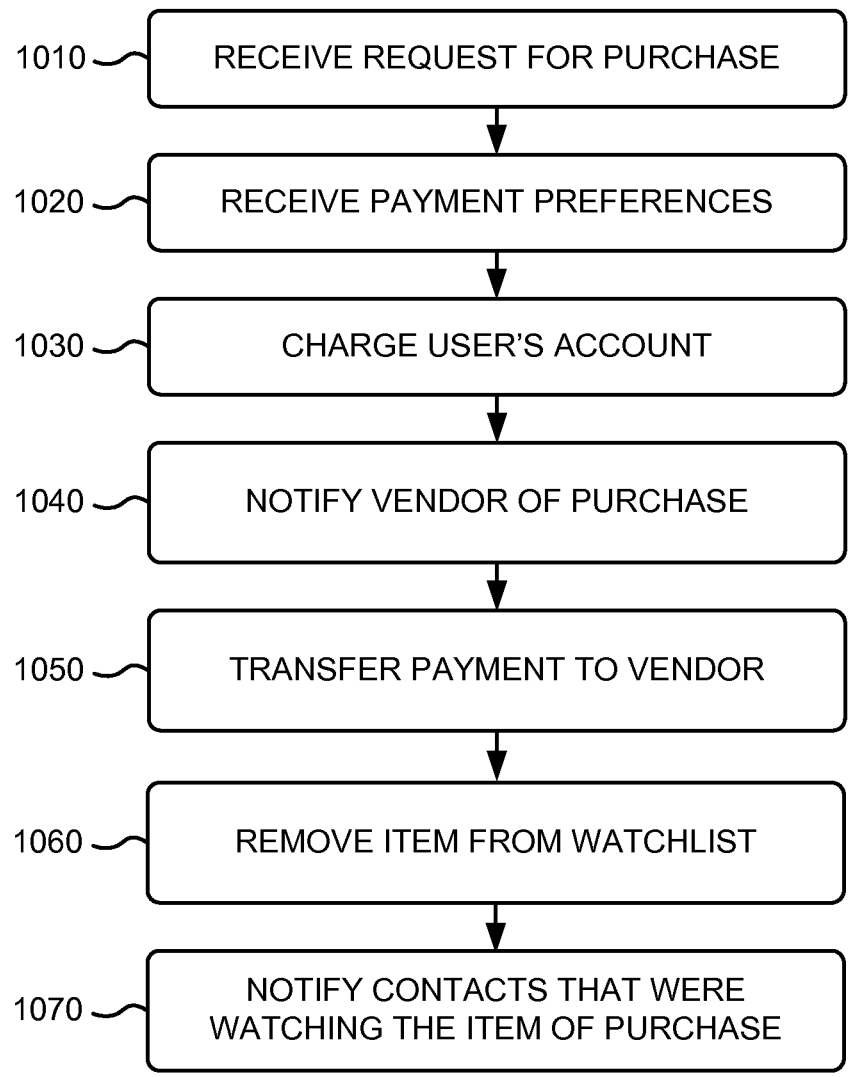
FIG. 10 is a flow diagram illustrating an example process of processing a purchase according to an implementation described herein.

FIG. 10 is a flow diagram illustrating an example process of processing a purchase according to an implementation described herein. In one implementation, the process of FIG. 10 may be performed by billing system 145. In other implementations, some or all of the process of FIG. 10 may be performed by another device or a group of devices separate from or including billing system 145.

The process of FIG. 10 may include receiving a request for a purchase (block 1010). For example, shopping system 140 may receive, from client device 110, a request to buy a particular item from the user's watch list from a particular vendor. Shopping system 140 may contact billing system 145 to perform a purchase transaction.

Payment preferences may be received (block 1020). For example, billing system 145 may send a request to client device 110, asking that the user indicate how the user would like to pay for the item. Billing system 145 may receive payment information from the user. A user's account may be charged (block 1030). For example, billing system 145 may receive an indication that the user would like to charge an account associated with the user in order to pay for the item. For example, the user may indicate to charge an account associated with service provided by provider gateway 120.

A vendor may be notified of the purchase (block 1040). For example, billing system 145 may notify the vendor that the item was purchased. A payment may be transferred to the vendor (block 1050). For example, billing system 145 may send a payment to the vendor to pay for the item. Billing system 145 may provide information to the vendor to allow the vendor to deliver the item to the user, without providing particular information about the user to the vendor (e.g., an email address and/or a phone number).

A purchased item may be removed form a watch list (block 1060). For example, watch list monitor 410 may remove the item from the user's watch list, in response to the user purchasing the item. Alternatively, a user may actively remove the item from the user's watch list. One or more contacts that were watching the purchased item may be notified of the purchase (block 1070). For example, contact monitor 460 may send an indication to contacts, associated with the user, that included the item on the contacts' watch list in associated with the user.

Figure 11:
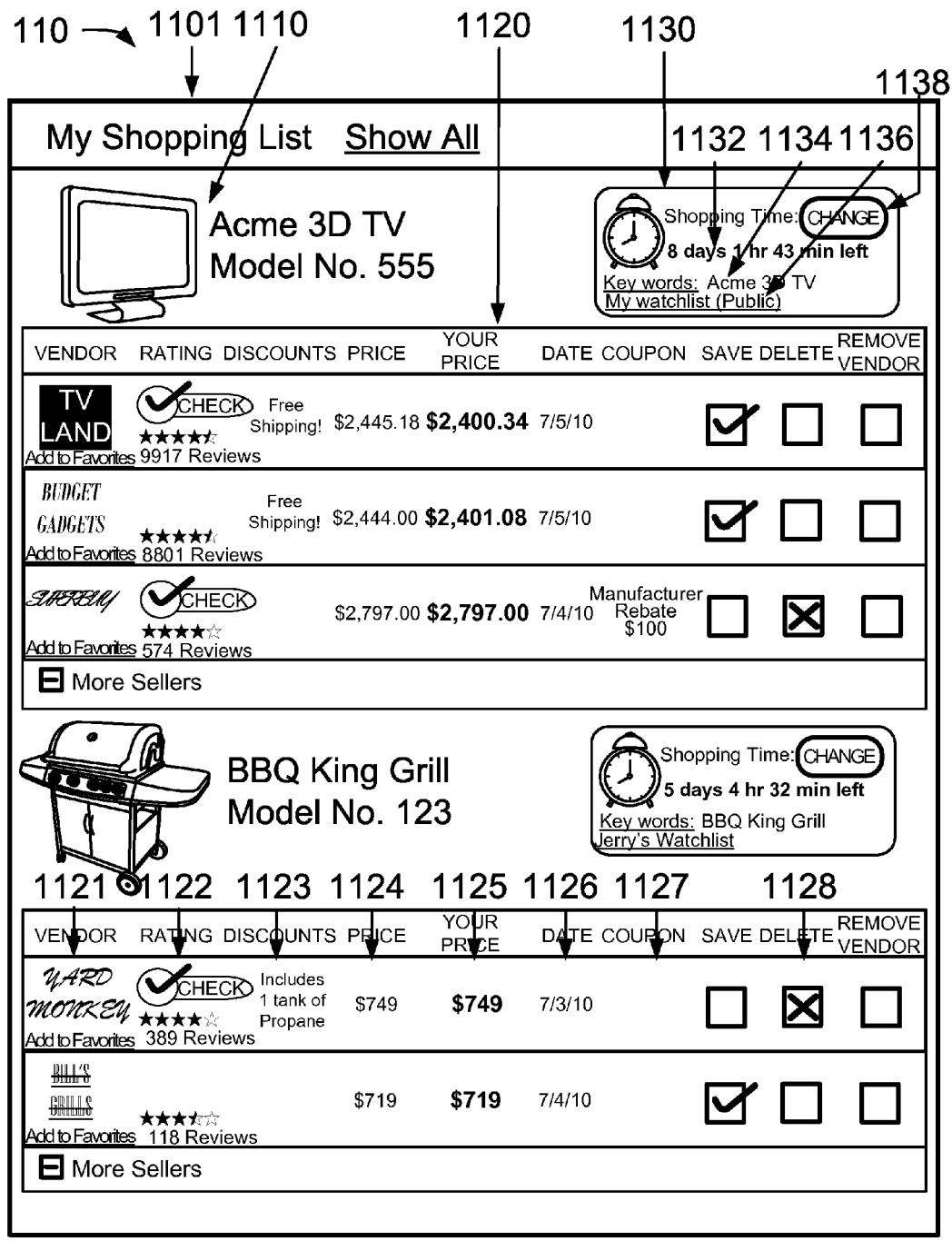
FIG. 11 is an example of a first user interface according to an implementation described herein.

FIG. 11 is an example of a first user interface 1101 according to an implementation described herein. As shown in FIG. 11, first user interface 1101 may include one or more item descriptions 1110, a list of one or more vendor offers 1120 (referred to herein as "vendor offers 1120" collectively and as "vendor offer 1120" individually), and a shopping time indicator 1130.

Item description 1110 may include a picture of the item and/or a description of the item. Items depicted in user interface 1101 may be ranked based on one or more factors. For example, items associated with the user may be shown first, followed by items associated with the user's contacts, ranked based on contact level. Furthermore, the user's items, and/or items associated with a particular contact level, may be further ranked based on schedule. For example, items whose date range will expire earlier may be shown first.

Vendor offers 1120 may include a list of identified matching vendor offers associated with the item shown in item description 1110. Vendor offers 1120 may be ranked based on one or more factors. For example, vendor offers 1120 may be ranked based on price. A vendor offer 1120 may include a vendor name area 1121, a vendor rating area 1122, discounts area 1123, a regular price area 1124, an offer price area 1125, a date area 1126, coupons area 1127, and buttons area 1128.

Vendor name area 1121 may include a vendor name and/or a logo or icon associated with the vendor. Vendor rating area 1122 may include a rating, based on user ratings, associated with the vendor as well as a number of ratings on which the vendor rating is based. Additionally or alternatively, vendor rating area 1122 may include an icon if the vendor has gone through an approval process associated with shopping system 140. If the particular vendor has gone through an approval process associated with shopping system 140, shopping system 140 may provide a particular guarantee to the user if the user selects to purchase the item from the particular vendor.

Discounts area 1123 may include information about particular discounts offered in association with the item. Regular price area 1124 may include information about a regular price associated with the item. Offered price area 1125 may include information about an offered price associated with the item. Date area 1126 may include information about a date associated with the offered price. Coupons area 1127 may include information about coupons associated with the item. Control buttons area 128 may include one or more control buttons associated with the vendor offer, such a button to save the offer, a button to delete the offer, and/or a button to remove the vendor associated with the vendor offer.

Shopping time indicator 1130 may include information about the amount of time that is left for shopping for the item based on the item schedule specified by the user. Shopping time indicator 1130 may include a shopping time area 1132, a keywords area 1134, a contact area 1136, and a change button 1138. Shopping time area 1132 may include information about how much shopping time is left for the item based on the user's schedule. Keywords area 1134 may include one or more keywords associated with the item. Contacts area 1136 may include information about a contact associated with the item. Change button 1138 may include a button that may be activated to change information associated with the item.

Although FIG. 11 shows example components of interface 1101, in other implementations, interface 1101 may include fewer components, different components, differently arranged components, or additional components than depicted in FIG. 11. Additionally or alternatively, one or more components of interface 1101 may perform the tasks described as being performed by one or more other components of interface 1101.

Figure 12:
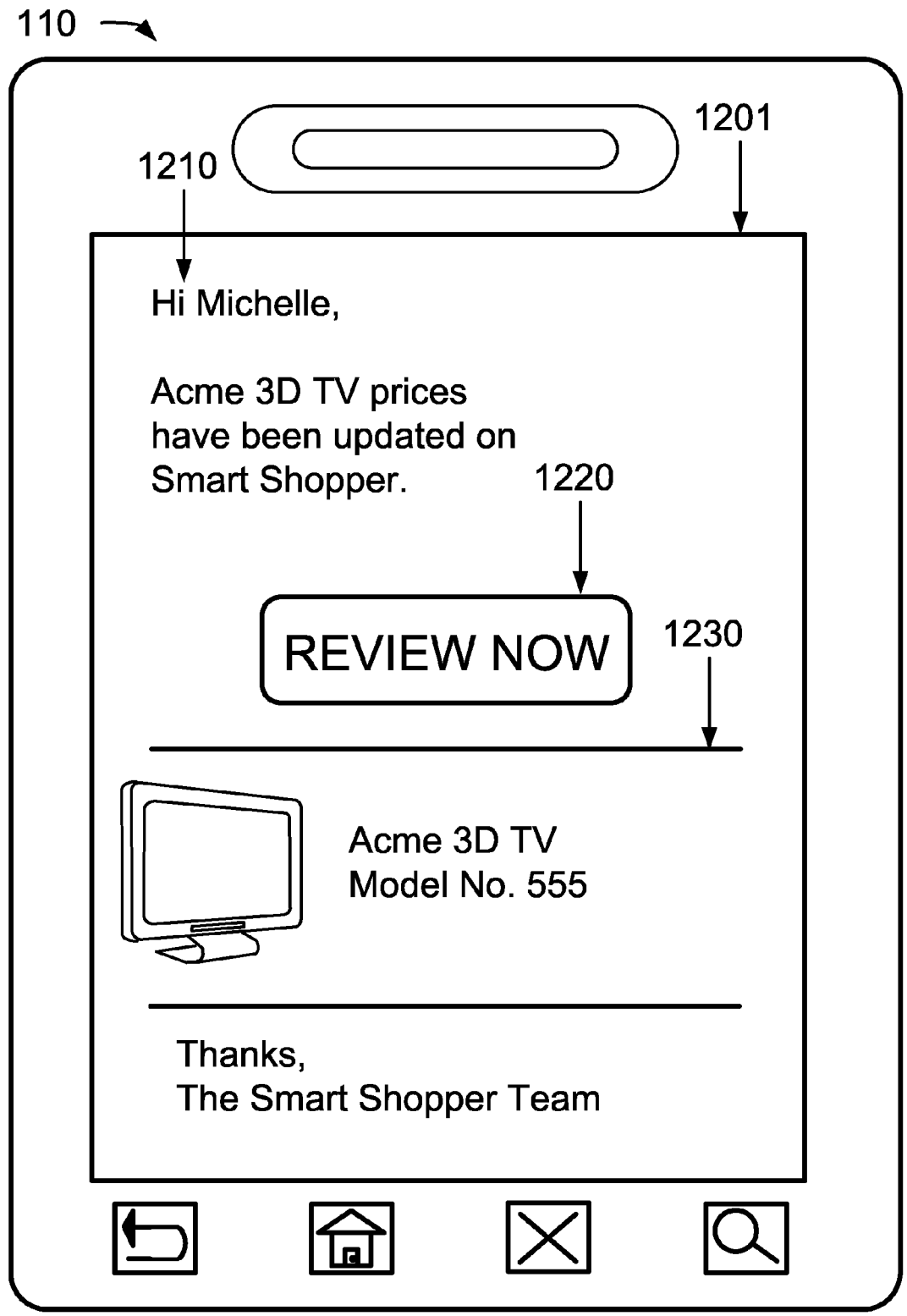
FIG. 12 is an example of a second user interface according to an implementation described herein.

FIG. 12 is a second example of a user interface 1201 according to an implementation described herein. Interface 1201 may be provided to a user as a notification in response to detecting a change in a vendor offer or in response to identifying a new vendor offer associated with an item on the user's watch list. As shown in FIG. 12, second user interface 1201 may include a message 1210, a review button 1220, and an item area 1230. Message 1210 may include a message that includes a notification to the user about an item on the user's watch list. Review button 1220 may include a button that may be activated by the user to access the user's watch list and/or additional information regarding the item. Item area 1230 may include textual information and/or graphics identifying the item associated with message 1210.

Although FIG. 12 shows example components of interface 1201, in other implementations, interface 1201 may include fewer components, different components, differently arranged components, or additional components than depicted in FIG. 12. Additionally or alternatively, one or more components of interface 1201 may perform the tasks described as being performed by one or more other components of interface 1201.

A further implementation of the systems and methods described herein may relate to collecting information from users' wish lists, anonymizing the information, performing statistical analysis on the collected information, and/or providing the information to manufacturers and/or advertisers. Assume that a particular number of users have placed a particular item in their respective wish lists for a particular time period. For example, assume 50,000 users have placed a particular model of a grill in their wish lists and indicated that they would like to purchase the particular model of the grill during the month of April. Without revealing the users' identities, this information may be sold, or otherwise provided, to the manufacturer of the grill. This may enable the manufacturer to scale production of the particular model of the grill to meet the anticipated demand during the particular time period.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-10, the order of the blocks may be modified in other implementations. Further, non-dependent blocks may be performed in parallel.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   receiving, by the one or more server devices and from a user, a request to add an item to a watch list associated with the user;
   receiving, by the one or more server devices and from the user, a price associated with the item;
   receiving, by the one or more server devices and from the user, a schedule associated with the item;
   receiving, by the one or more server devices and from the user, a privacy level assigned to the item by the user;
   identifying, by the one or more server devices, a contact associated with the user, wherein the contact has been designated by the user to receive information about the item based on the assigned privacy level;
   adding, by the one or more server devices, the item to the identified contact's watch list, in response to identifying the contact;
   identifying, by a processor associated with the one or more server devices, a vendor offer associated with the item and associated with a particular vendor, where the vendor offer includes a price that is less than or equal to the received price associated with the item, the identifying being based on the schedule associated with the item; and
   providing, by the one or more server devices, a notification to the user, wherein the notification includes information about the identified vendor offer.

2. The method of claim 1, further comprising:
   receiving, from the user, a notification specification associated with the item; and
   where providing the notification is based on the received notification specification.

3. The method of claim 2, where the notification specification includes one or more of:
   an indication that a notification is to be provided immediately in response to identifying the vendor offer;
   an indication that a notification is to be provided at a particular interval; or
   an indication that a reminder is to be sent at a particular interval.

4. The method of claim 1, further comprising
   providing a notification to the identified contact, wherein the notification includes information about the identified vendor offer.

5. The method of claim 1, further comprising:
   generating rank scores for vendor offers identified as associated with the item based on an offer price associated with the vendor offers;
   generating a rank score for the item based on the schedule associated with the item; and
   providing the watch list to the user, wherein the watch list includes the item at a position based on the generated rank score for the item, and wherein the vendor offers associated with the item are positioned based on the generated rank scores associated with the vendor offers.

6. The method of claim 5, further comprising:
   providing, with the watch list, an indication of an amount of shopping time left for the item, based on the received schedule associated with the item.

7. The method of claim 1, further comprising:
   determining that another contact, associated with the user, has added another item to a watch list of the other contact;
   determining that the user is authorized to be notified about the other item, based on a privacy level assigned to the other item by the other contact; and
   sending a notification to the user indicating that the other contact has added the other item to the watch list of the other contact, based on determining that the user is authorized to be notified about the other item.

8. The method of claim 1, further comprising:
   detecting a change in the identified vendor offer; and
   providing a notification to the user, in response to detecting the identified vendor offer.

9. The method of claim 1, where identifying the vendor offer comprises storing one or more of:
   a vendor name associated with the particular vendor,
   a vendor rating associated with the particular vendor,
   a discount associated with the item,
   a regular price associated with the item,
   an offer price associated with the vendor offer,
   a date associated with the vendor offer,
   a coupon associated with the vendor offer, or
   a manufacturer's coupon associated with the item.

10. The method of claim 1, further comprising:
    receiving, from the user, a request to purchase the item from the particular vendor;
    performing a purchase transaction with the particular vendor for the item; and
    removing the item from the user's watch list.

11. A server device comprising:
a memory to store instructions; and
a processor configured to execute the instructions to implement:
    a watch list database configured to store, for a user, a watch list of items;
    a watch list manager configured to:
        receive a request to add an item to add to the watch list;
        receive a price associated with the item; and
        receive a schedule associated with the item, the schedule indicating a date range for monitoring the item;
    a contact manager configured to:
        receive a privacy level assigned to the item by the user;
        identify a contact associated with the user, wherein the contact has been designated by the user to receive information about the item based on the assigned privacy level; and
        add the item to the identified contact's watch list, in response to identifying the contact;
    a vendor monitor configured to:
        identify a vendor offer associated with the item and associated with a particular vendor, where the vendor offer is less than or equal to the received price and the received schedule; and
    a user interface to:
        provide a notification to the user, wherein the notification includes information about the identified vendor offer.

12. The server device of claim 11, wherein the contact monitor is further configured to:
    determine whether the user is allowed to view a particular item on a watch list associated with the contact or another contact associated with the user; and
    send a notification to the user when the contact or the other contact has added the particular item to the watch list associated with the contact or the other contact, in response to determining that the user is allowed to view the particular item.

13. The server device of claim 11, where the watch list manager is further configured to:
    receive, from the user, a notification specification associated with the item; and
    wherein the user interface is configured to provide the notification is based on the received notification specification.

14. The server device of claim 11, where the vendor monitor is further configured to:
    store, in the watch list database, one or more of:
    a vendor name associated with the particular vendor,
    a vendor rating associated with the particular vendor,
    a discount associated with the item,
    a regular price associated with the item,
    an offer price associated with the vendor offer,
    a date associated with the vendor offer, or
    a coupon associated with the vendor offer.

15. The server device of claim 11, wherein the watch list manager is further configured to:
    identify a plurality of vendor offers, associated with the item, the plurality of vendor offers including the vendor offer;
    generate rank scores for the identified plurality of vendor offers, associated with the item, based on an offer price associated with the identified plurality of vendor offers; and
    provide the watch list to the user, wherein the watch list includes the identified plurality of vendor offers, and wherein plurality of the vendor offers associated with the item are positioned based on the generated rank scores associated with the vendor offers.

16. The server device of claim 11, wherein the vendor monitor is further configured to detect a change in the identified vendor offer; and wherein the user interface is further to provide a notification to the user, in response to detecting the change in the identified vendor offer.

17. The server device of claim 11, further comprising:
    a billing interface configured to:
        receive, from the user, a request to purchase the item from the particular vendor; and
        perform a purchase transaction with the particular vendor for the item; and
    wherein the watch list monitor is further configured to:
        remove the item from the user's watch list when the billing interface receives the request to purchase the item.

18. One or more computer-readable memory devices storing instructions executable by one or more processors, the one or more computer-readable memory devices comprising:
    one or more instructions to receive, from a user, a request to add an item to a watch list associated with the user;
    one or more instructions to receive, from the user, a price associated with the item;
    one or more instructions to receive, from the user, a schedule associated with the item;
    one or more instructions to receive a privacy level assigned to the item by the user;
    one or more instructions to identify a contact associated with the user, wherein the contact has been designated by the user to receive information about the item based on the assigned privacy level;
    one or more instructions to add the item to the identified contact's watch list, in response to identifying the contact;
    one or more instructions to identify a plurality of vendor offers associated with the item and associated with particular vendors, where each one of the plurality of vendor offers includes a price that is less than or equal to the received price associated with the item, the identifying being based on the schedule associated with the item;
    one or more instructions to generate rank scores for the plurality of vendor offers based on one or more criteria; and
    one or more instructions to provide the watch list to the user, wherein the watch list includes the plurality of vendor offers sorted based on the generated rank scores.

* * * * *